3,809,713
PROCESS FOR PRODUCING SILAZANE COMPOUNDS

Robert Paul Boersma, Frank Dominic Mendicino, and George Michael Omietanski, Marietta, Ohio, assignors to Union Carbide Corporation, New York, N.Y.
No Drawing. Filed Mar. 1, 1973, Ser. No. 337,110
Int. Cl. C07f 7/10, 7/18
U.S. Cl. 260—448.2 E           11 Claims

ABSTRACT OF THE DISCLOSURE

Process for producing silazane compounds by reacting a halosilane with ammonia in the presence of alkylene diamine.

BACKGROUND OF THE INVENTION

This invention relates to a novel process for producing silazane compounds. More particularly this invention relates to a process for preparing silazane compounds by reacting a halosilane with ammonia and separating the silazane product from the hydrogen halide by-product of the process.

As is well known in the art, silazane compounds are prepared by reacting a halosilane with ammonia. For example, the reaction of trimethylchlorosilane and ammonia produces hexamethyldisilazane, while the reaction of dimethyldichlorosilane and ammonia produces dimethylcyclisilazanes. However such a reaction has the disadvantage of also producing large amounts of hydrogen halide as a by-product which normally takes the form of a hydrogen halide salt of ammonia, e.g. $NH_3 \cdot HCl$. Moreover, the undesirable hydrogen halide by-product is a fine particulate, bulky solid precipitate that obstructs filtration and occludes much of the desired silazane product. The use of organic solvents to solve this problem has been proposed, however large amounts of solvent are required and the recovery of silazane product is still difficult and time consuming. The use of basic (e.g. $Na_2CO_3$) water has also been proposed for the removal of the hydrogen halide by-product. However, again large amounts of the basic water are required and the use of same causes a poorer yield of silazane product since the silazane will react with water to form a siloxane and the formation of the siloxane compound also makes recovery of the silazane difficult.

SUMMARY OF THE INVENTION

It has now been discovered that the above problems and disadvantages may be overcome by the instant invention which comprises employing an alkylene diamine to separate the hydrogen halide by-product from the desired silazane product.

Therefore it is an object of this invention to provide an efficient and economical process for preparing silazane compounds. Another object of this invention is to provide a process, as above described, in which the silazane product may be easily separated from the hydrogen halide by-product. Other objects and advantages of this invention will become readily apparent from the following description and appended claims.

Accordingly, this invention relates to a process for preparing a silazane compound which comprises reacting a halosilane with ammonia and separating the liquid silazane product from the hydrogen halide by-product by contacting the hydrogen halide with a sufficient amount of alkylene diamine to form a liquid hydrogen halide-alkylene diamine salt phase that will separate and settle to the bottom of the liquid silazane product phase.

DESCRIPTION OF THE PREFERRED EMBODIMENTS

It has been surprisingly found that alkylene diamine can be used as an acid acceptor for the general halosilane ammonia reaction and that under the conditions of the process of this invention the normally troublesome hydrogen halide by-product can be easily separated from the desired silazane product as a separate liquid hydrogen halide-ethylene diamine salt phase, e.g.

$$NH_2C_2H_4NH_2 \cdot HCl$$

For instance, by carrying out the general halosilane-ammonia reaction of the instant invention in the presence of the alkylene diamine, two liquid phases are formed and separated while holding the temperature at at least 70° C. The top phase or layer consists of the desired silazane product while the bottom phase or layer is the liquid alkylene diamine-hydrogen halide salt. Such a process may be illustrated by the following exemplary reaction:

$$2(CH_3)_3SiCl + NH_3 + 2H_2NC_2H_4NH_2 \rightarrow$$
$$(CH_3)_3SiNHSi(CH_3)_3 + 2H_2NC_2H_4NH_2 \cdot HCl$$

Alternatively the general halosilane-ammonia reaction may be carried out in the absence of alkylene diamine and the solid hydrogen halide ammonia salt by-product converted, by contacting it with an alkylene diamine at a temperature of at least 70° C., to the liquid alkylene diamine-hydrogen halide salt, again resulting in two separate liquid phases as described above, the top layer again being the liquid silazane product. Such a process may be illustrated by the following exemplary reaction:

$$2(CH_3)_3SiCl + 3NH_3 \rightarrow$$
$$(CH_3)_3SiNHSi(CH_3)_3 + 2NH_3 \cdot HCl$$
$$2NH_3 \cdot HCl + 2H_2NC_2H_4NH_2 \rightarrow$$
$$2H_2NC_2H_4NH_2 \cdot HCl + 2NH_3$$

Of course it is obvious that while the final separation of the two above described liquid phases should be conducted at a temperature of at least 70° C., the separation may be accomplished by any simple method such as decantation, draining, and the like. The preferred mode of operating is to carry out the reaction in the presence of an alkylene diamine thereby directly forming the alkylene diamine-hydrogen halide salt and eliminating the need of venting off large amounts of ammonia gas. The general preferred halosilane-ammonia process of this invention normally results in a recovery of desired silazane product based on the amount of starting halosilane of 90 weight percent or better and simple distillation of the silazane product can result in a product purity of 99 plus percent.

Another advantage of the general preferred halosilane-ammonia reaction of this invention is that the minimum level of ammonia required for this process is less than one third as much as taught to be required by heretofore prior art methods. It has further been surprisingly discovered that the mode and order of the addition of the three ingredients, i.e. halosilane, ammonia and alkylene diamine is not critical.

More specifically this invention is a process for preparing a silazane compound which comprises reacting a halosilane selected from the group consisting of a monohalosilane having the formula $$R_3SiX$$

wherein each R is a radical individually selected from the group consisting of lower alkyl, vinyl, phenyl and lower alkoxy radicals, and X is a halogen atom selected from the group consisting of chlorine, bromine, and iodine, and a dihalosilane having the formula $$R_2SiX_2$$

wherein R and X are the same as defined above, with ammonia in the presence of an alkylene diamine to form a liquid hydrogen halide-alkylene diamine salt phase that will settle to the bottom of the liquid silazane product phase that is also formed and separating said phases while maintaining a separation temperature of at least 70° C., wherein the molar amount of ammonia employed is at least about 50 percent of the amount that is stoichiometrically equivalent to the equivalent number of silane-halogen bonds to be reacted, and wherein the molar amount of alkylene diamine employed ranges from about 90 percent of the amount that is stoichiometrically equivalent to the equivalent number of silane-halogen bonds to be reacted to a stoichiometric excess of about 10 percent.

As pointed out above, the manner and order in which the three ingredients, halosilane, ammonia and ethylene diamine are mixed is not critical. However, preferably the halosilane-ammonia reaction is carried out in the presence of ethylene diamine. This preferred method requires much less ammonia and forms the liquid hydrogenhalide-ethylene diamine salt directly thereby eliminating the necessity of converting solid ammonia-hydrogen halide to said liquid and venting off excess ammonia gas when the reaction is carried out in the absence of ethylene diamine.

Thus disilazane compounds having the formula $$R_3SiNHSiR_3$$

wherein R is the same as defined above are prepared when the starting material is a monohalosilane as defined above. Such monohalosilane as well as methods for their production are well known in the art. Illustrative examples of such monohalosilanes that may be employed include, e.g., $(CH_3)_3SiCl$, $(C_2H_5)_3SiCl$, $(CH_3)_2C_2H_5SiCl$,

$(CH_3)_3SiBr$, $(CH_3)_3SiI$, $(CH_3)_2(CH_3O)SiCl$, $(CH_3)_2(C_2H_5O)SiCl$ $(CH_3)_2(CH_2=CH)SiCl$, and the like. Monochlorosilanes are preferred while trimethylchlorosilane and dimethylethoxychlorosilane are most preferred especially trimethylchlorosilane. Of course it is obvious that the particular disilazane product will merely depend upon the choice of the silane starting material, e.g., $(CH_3)_3SiCl$ being used to form $(CH_3)_3Si—NH—Si(CH_3)_3$; $(CH_3)_2(C_2H_5O)SiCl$ being used to form $(CH_3)_2(C_2H_5O—)Si—NH—Si(—OC_2H_5)(CH_3)_2$ and the like. Of course mixtures of such monohalosilanes can be used if desired.

Similarly cyclic silazane compounds having the formula $$[R_2SiNH]_n$$

wherein R is the same as defined above and $n$ is an integer of at least 3 are prepared when the starting material is a dihalosilane as defined above. Such dihalosilanes as well as methods for their production are well known in the art. Illustrative examples of such dihalosilanes that may be employed include, e.g., $(CH_3)_2SiCl_2$, $(C_2H_5)_2SiCl_2$, $(CH_3)(C_2H_5)SiCl_2$, $(CH_3)_2SiBr_2$, $(CH_3)_2SiI_2$,

$(CH_3)(C_2H_5O)SiCl_2$, $(CH_3)(CH_2=CH—)SiCl_2$, and the like. Again it is obvious that the particular cyclic silazane product will merely depend upon the choice of the silane material e.g., $(CH_3)_2SiCl_2$ being used to form cyclic silazanes such as $[(CH_3)_2SiNH]_3$ and $[(CH_3)_2SiNH]_4$, and the like. Of course mixtures of such dihalosilanes can be used if desired.

The alkylene diamine compounds that may be employed in the instant invention are well known in the art as are methods for their preparation. Such compounds include those of the formula $$R_2'NR''NR_2'$$

wherein each R' radical is individually selected from the class consisting of hydrogen, lower alkyl and silyl radicals having the formula —SiX₃ wherein X is a lower alkyl radical and R'' is a divalent alkylene radical having from 2 to 4 carbon atoms. Illustrative examples of same are ethylene diamine, 1,2-propylene diamine, 1,3-propylene diamine, 1,4-butylene diamine, N,N-dimethyl ethylene diamine and N,N'-bis(trimethyl-silyl)ethylene diamine. The preferred alkylene diamines are ethylene diamine, $(H_2NC_2H_4NH_2)$, and N,N'-bis(trimethylsilyl)ethylene diamine, $[(CH_3)_3SiNHC_2H_4NHSi(CH_3)_3]$, and most preferably ethylene diamine. Of course mixtures of such alkylene diamines can be used if desired.

The molar amount of ammonia employed by the general halosilane-ammonia process of this invention is at least about 50 percent of the amount that is stoichiometrically equivalent to the amount or number of silane-halogen bonds desired to be reacted. Of course amounts in excess of this minimum level may be used if desired but such is generally not preferred unless it is desired to carry out the reaction in the absence of alkylene diamine and thereafter convert the solid hydrogen halide (e.g. $NH_3·HCl$) by-product to the liquid hydrogen halide salt of alkylene diamine (e.g. $NH_2C_2H_4NH_2·HCl$). Thus when disilazane products are prepared the reaction preferably involves 2 moles of the monohalosilane, 1 mole of ammonia and 2 moles of the alkylene diamine; while when cyclic silazanes are prepared the reaction preferably involves a molar ratio of dihalosilane to ammonia to alkylene diamine of 1:1:2. The use of only 0.5 mole of ammonia per silane-halogen bond to be reacted is in sharp contrast to prior art methods which teach the necessity of at least 1.5 moles of ammonia per silane-halogen bond to be reacted. However in the less preferred method of this invention wherein the halosilane-ammonia reaction is conducted in the absence of alkylene diamine the use of an excess amount of ammonia of about 1.5 moles is also preferred.

The molar amount of alkylene diamine employed by the general halosilane-ammonia process of this invention will of course merely depend on the desired efficiency of the process taking into account such obvious factors as the amount of halide by-product desired to be removed, the amount and purity of the silazane product desired, and the like. Accordingly the molar amount of alkylene diamine employed preferably ranges from about 90 percent of the amount that is stoichiometrically equivalent to the equivalent number of silane-halogen bonds to be reacted to a stoichiometric excess of about 10 percent. Lower and higher amounts of alkylene diamine can be used but offer no apparent advantage and in fact can be undesirable in reducing the yield of the silazane product desired. Thus it is most preferred to employ that amount of alkylene diamine that is stoichiometrically equivalent to the equivalent number of silane-halogen bonds to be reacted or as near as possible to such a molar ratio. Of course it is to be understood that the amount of alkylene diamine need not be present all at once but may be added gradually to the reaction.

Since the general halosilane-ammonia process of this invention is exothermic the reaction temperature is not critical. Normally the reaction is conducted at temperatures ranging from about room temperature to about 100° C., preferably from about 70° C. to about 100° C. Lower initial temperatures or higher temperatures may be employed but offer no advantage. Of course the most preferred choice of operable reaction temperature in any specific instance will depend largely upon the reactants employed, their physical properties, and the like. However in order to achieve the maximum benefit of the instant invention the alkylene diamine-hydrogen halide salt by-product should be maintained as a liquid during the separation step of the process and such preferably requires that the separation step of the two liquid phases be maintained at a temperature of at least 70° C. While the upper limit of this temperature range is not critical, save for the boiling point of the various products, separation of the two liquid phases is generally conducted at a temperature ranging from about 70° C. to about 100° C.

The reaction can be conducted under pressure or at atmospheric pressure. It is preferred to employ autogenous pressure, i.e., that pressure sufficient to retain the volatile reactants in the system. Of course it is also preferred that the reaction be conducted under substantially anhydrous conditions so as to prevent any possible undesirable side reactions.

More specifically the preferred general halosilane-ammonia process of this invention may be typically conducted as follows: An alkylene diamine in the prescribed amount, as discussed is saturated with ammonia in a suitable reaction vessel, which is preferably maintained under anhydrous conditions and the mixture heated with moderate to vigorous agitation to a temperature of at least 70° C. The halosilane is then added along with the gradual addition of the rest of the above prescribed amount of ammonia and the reaction maintained until completed which should normally be within 6 hours, longer reaction times offer no apparent advantage. Generally the reaction time will be only from 1 to 2 hours at about 80° C. Upon completion of the reaction agitation is stopped and the reaction mass allowed to settle into two liquid phases while holding the temperature at at least 70° C. Separation is normally completed within one hour. While maintaining the temperature at at least 70° C. the desired silazane product, the top liquid product phase, may be easily separated from the liquid alkylene diamine-hydrogen halide by-product and recovered by simple decantation, draining, distillation, and the like. Of course, if desired the silazane product may be further purified by any conventional method, such as distillation to remove minor impurities that may be found in the liquid top layer product phase obtained, such as lites, heavies and the like.

The silazane products of the instant invention have a wide range of utility well known in the art. For example, they are commonly employed as silylating agents for compounds having reactive groups, such as hydroxyl groups, so that the compounds may be further reacted, distilled, undergo chromatographic analysis, and the like. They are also employed as silylating agents in the manufacture of synthetic penicillin. They can also be used to impart hydrophobic properties to silica fillers and as a source of ammonia where the controlled release of ammonia is desirable.

The following examples are illustrative of the present invention and are not to be regarded as limitations. It is to be understood that all parts, percentages and proportions referred to herein and in the appended claims are by weight unless otherwise indicated.

Example 1

Into a one liter, three neck flask having a bottom take off and equipped with a sparge tube, a Y-tube, water condenser and thermometer were added 300 grams (5 moles) of ethylene diamine which was heated to 75° C. Under agitation and from different feed tanks containing 540 grams (5 moles) of trimethylchlorosilane and 53.13 grams (3 moles) of ammonia said silane and ammonia were simultaneously added and the exothermic reaction was maintained at 75° C. to 85° C. The ammonia was added at such a rate as to maintain a pressure of 4 pounds per square inch and it took 52 minutes for all of the silane to be added. The addition of the remainder of the ammonia was continued at 75° C. and took about 5 hours at which time the ethylene diamine-hydrochloride salt by-product was a liquid. While maintaining the 75° C. temperature the agitation was stopped and the two liquid phases allowed to separate. Decantation of the liquid bottom phase gave 464.7 grams of ethylene diamine-hydrochloride by-product ($H_2NC_2H_4NH_2 \cdot HCl$) having a chloride content of 35 percent. Vapor phase chromatographic analysis of the 402 grams of top product phase obtained showed 9.5% lites, 4.4% hexamethyldisiloxane, 1.8% N,N'-bis(trimethylsilyl) ethylene diamine, 0.2% heavies and 84.4% of desired hexamethyldisilazane,

product which represents a 92 percent yield (339 grams) of desired hexamethyldisilazane.

Example 2

To a one liter, three-neck flask having the same fittings as in Example 1, were added 240 grams (4 moles) of ethylene diamine. Under agitation and at room temperature ammonia was added at such a rate as to maintain a pressure of 4 pounds per square inch, along with the addition of 258 grams (2 moles) of dimethyldichlorosilane. An exothermic reaction occurred and the temperature rose to 89° C. Addition of all of the silane took 40 minutes. The addition of ammonia was continued and the temperature maintained at 70° C. to 80° C. until all of the chloride by-product had turned liquid. While maintaining the temperature, 150 grams of benzene were added to assist phase separation, agitation stopped and the two liquid phases allowed to separate. Decantation of the liquid bottom phase gave 360 grams of ethylene diamine-hydrochloride by-product having a chloride content of 34 percent. The liquid top phase amounted to 284 grams of silazane product and benzene which was stripped at 110° C. to remove the benzene. 134 grams of crude silazane product was recovered which infrared analysis showed to be cyclic disilazane having the formula

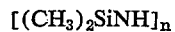

where $n$ is at least 3, which represents a 92 percent yield of product.

Example 3

Into a one liter, three-neck flask having the same fittings as in Example 1 were added 60 grams (1 mole) of ethylene diamine which was heated to 80° C. With agitation ammonia was sparged into the system at such a rate that it did not pass the condenser along with the addition of 128 grams (0.93 mole) of dimethylethoxychlorosilane and the temperature was maintained at 80°–85° C. It took 45 minutes for all of the silane to be added and the ammonia sparge was continued until all of the chloride by-product had turned liquid. While still maintaining the temperature at about 80° C. agitation was stopped to allow the two liquid phases to separate. Decantation of the liquid bottom phase gave 85 grams of ethylene diamine-hydrochloride by-product having a chloride content of 35 percent. The liquid top phase amounted to 103 grams which vapor phase chromatographic analysis showed to contain 28.3 grams of desired 1,3-diethoxytetramethyldisilazane,

product which represents a 27.5 percent yield.

Example 4

Into a one liter, three-neck flask having the same fittings as in Example 1, were added 204 grams (1 mole) of N,N'-bis(trimethylsilyl)ethylene diamine. Under agitation and at room temperature 102 grams (0.94 mole) of trimethylchlorosilane was slowly added along with an ammonia sparge at such a rate that the ammonia did not pass the condenser. The reaction was exothermic and the temperature maintained at 75° C. to 80° C. Upon addition of all of the silane the ammonia sparge was continued while the temperature was maintained until all of the chloride by-product had turned liquid. Agitation was stopped and the two liquid layers allowed to separate. Decantation of the liquid bottom phase gave 86.6 grams of ethylene diamine-hydrochloride by-product having a chloride content of 36.8 percent. Vapor phase chromatographic analysis of the 201 grams of top product phase obtained showed it to contain 1.4% lites, 1.3% hexamethyldisiloxane, 2.6% N,N'-bis(trimethylsilyl)ethylene diamine, 4.9% heavies and 89.7% of desired hexamethyldisilazane product which represents a 77 percent yield (181 grams) of desired hexamethyldisilazane.

Example 5

Into a 500 cc., three-neck flask equipped with the same fittings as in Example 1, were added 20 grams (0.22 mole) of N,N-dimethyl ethylene diamine [$(CH_3)_2NC_2H_4NH_2$] which was heated to 80° C. With agitation 24.4 grams (0.2 mole) of trimethylchlorosilane were added over 45 minutes followed by the addition of 2.5 grams of ammonia at such a rate that it did not pass the condenser. The reaction was exothermic at 80° C.–90° C. Agitation was then stopped and the two liquid phases allowed to settle while the temperature was maintained at about 80° C. Decantation of the liquid bottom phase gave 26 grams of N,N-dimethyl ethylene diamine-hydrochloride by-product, [$(CH_3)_2NC_2H_4NH_2 \cdot HCl$] which had a chloride content of 26 percent. Vapor phase chromatographic analysis of the 19 grams of top liquid phase obtained showed an 85 percent yield (14.6 grams) of desired hexamethyldisilazane product.

Various modifications and variations of this invention will be obvious to a worker skilled in the art and it is to be understood that such modifications and variations are to be included within the purview of this application and the spirit and scope of the appended claims.

What is claimed is:

1. A process for preparing a silazane compound which comprises reacting a halosilane selected from the group consisting of a monohalosilane having the formula $$R_3SiX$$

wherein each R is individually a radical selected from the group consisting of lower alkyl, vinyl, phenyl, and lower alkoxy radicals, and X is a halogen atom selected from the group consisting of chlorine, bromine and iodine, and a dihalosilane having the formula $$R_2SiX_2$$

wherein R and X are the same as defined above, with ammonia in the presence of alkylene diamine of the formula $$R_2'NR''NR_2'$$

wherein each R' radical is individually selected from the class consisting of hydrogen, lower alkyl and silyl radicals having the formula $$-SiX_3$$

wherein X is a lower alkyl radical, to form a liquid alkylene diamine-hydrogen halide salt phase that will settle to the bottom of the liquid silazane product phase that is also formed while maintaining a separation temperature of at least 70° C., wherein the molar amount of ammonia employed is at least about 50 percent of the amount that is stoichiometrically equivalent to the equivalent number of silane-halogen bonds to be reacted and wherein the molar amount of alkylene diamine employed ranges from about 90 percent of the amount that is stoichiometrically equivalent to the equivalent number of silane-halogen bonds to be reacted to a stoichiometric excess of about 10 percent.

2. A process as defined in claim 1 wherein the alkylene diamine is ethylene diamine.

3. A process as defined in claim 1 wherein the alkylene diamine is N,N'-bis(trimethylsilyl) ethylene diamine.

4. A process as defined in claim 1 wherein the alkylene diamine is N,N-dimethyl ethylene diamine.

5. A process as defined in claim 2 wherein the halosilane is a monohalosilane selected from the class consisting of $(CH_3)_3SiCl$ and $(CH_3)_2(C_2H_5O)SiCl$.

6. A process as defined in claim 2 wherein the halosilane is $(CH_3)_2SiCl_2$.

7. A process as defined in claim 5 wherein the molar amount of ammonia employed is about 50 percent of the amount that is stoichiometrically equivalent to the equivalent number of silane-chlorine bonds to be reacted.

8. A process as defined in claim 7 wherein the chlorosilane reaction with ammonia is carried out under autogenous pressure, substantially anhydrous conditions and the separation of the two liquid phases is conducted at a temperature in the range from about 70° C. to 100° C.

9. A process as defined in claim 8 wherein the molar amount of alkylene diamine employed is about stoichiometrically equivalent to the equivalent number of silane-chlorine bonds to be reacted.

10. A process as defined in claim 9 wherein the halosilane is $(CH_3)_3SiCl$.

11. A process as defined in claim 9 wherein the halosilane is $(CH_3)_2(C_2H_5O)SiCl$.

References Cited

UNITED STATES PATENTS 3,530,092   9/1970   Borchert _____ 260—448.2 E X

PATRICK P. GARVIN, Primary Examiner

P. F. SHAVER, Assistant Examiner

U.S. Cl. X.R

260—448.2 N, 448.8 R